United States Patent [19]

Sussman

[11] 4,418,988

[45] Dec. 6, 1983

[54] MICROSCOPE OBJECTIVE

[75] Inventor: Milton H. Sussman, Amherst, N.Y.

[73] Assignee: Warner Lambert Technologies, Inc., Southbridge, Mass.

[21] Appl. No.: 235,786

[22] Filed: Feb. 19, 1981

[51] Int. Cl.³ .............................................. G02B 21/02
[52] U.S. Cl. .................................................... 350/414
[58] Field of Search ................................ 350/414, 469

[56] References Cited

U.S. PATENT DOCUMENTS

| | | | |
|---|---|---|---|
| 3,102,158 | 8/1963 | Ruben | 350/414 |
| 3,355,234 | 11/1968 | Muller | 350/414 |
| 3,437,398 | 4/1969 | Muller et al. | 350/422 X |
| 3,515,463 | 6/1970 | Rosenberger | 350/414 |
| 3,623,792 | 11/1971 | Uetake | 350/414 |
| 3,902,791 | 9/1975 | Shoemaker | 350/414 |
| 4,251,131 | 2/1981 | Tojo | 350/414 |

*Primary Examiner*—John K. Corbin
*Assistant Examiner*—Scott J. Sugarman
*Attorney, Agent, or Firm*—Alan H. Spencer

[57] ABSTRACT

A four-component microscope objective has a numerical aperture of 0.66. When used with a telescope objective as described in U.S. Pat. No. 3,355,234, the objective provides a magnification of 40X and is well corrected for the usual chromatic image aberrations, spherical aberration, coma and astigmatism.

2 Claims, 1 Drawing Figure

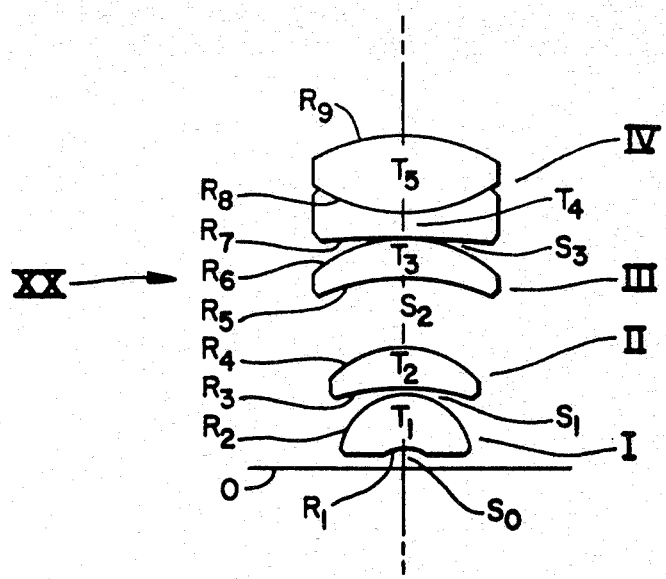

MICROSCOPE OBJECTIVE

BACKGROUND OF THE INVENTION

This invention relates to microscope objectives and more particularly to microscope objectives having a numerical aperture of substantially 0.66 and a magnification of 40X, when used with a telescope objective as described in U.S. Pat. No. 3,355,234.

Microscope objectives according to this invention are well corrected for the usual chromatic image aberrations, spherical aberration, coma and astigmatism when used with a telescope objective and have a substantially flat image field.

U.S. Pat. No. 3,437,398 issued Apr. 1969 and describes an objective shown in FIG. 6 which has four components. While the first two elements are singlets, the other two are both doublets and the power, when used with a telescope objective is 20X.

U.S. Pat. No. 3,515,463 issued June 1970 and describes a four-component having doublets as the last two components. The first lens is a concavo-convex singlet, the second and third are biconvex being a singlet and doublet, respectively. The last component is a convex-concave doublet to provide a power of 45X.

U.S. Pat. No. 3,623,792 issued November 1971 and describes a three-component objective having a magnification of 40X and a numerical aperture of 0.65. All three components are doublets with the second and third components being biconvex.

U.S. Pat. No. 3,902,791 issued September 1975 and describes a four-component microscope objective having a magnification of 40X, when used with a telescope objective, and a numerical aperture of 0.66. All four components are concavo-convex with the third and fourth being doublets. The objective does not have a hemispherical first element and requires an air space of about 8 mm. between the third and fourth components.

DESCRIPTION OF THE DRAWING AND INVENTION

The drawing is an optical diagram of an embodiment of the present invention.

Referring to the drawing, objective XX is shown in a view transverse to its optical axis relative to object plane O and illustrates the lens components aligned along the optical axis. The first component I of objective XX is a concavo-hemispherical positive singlet followed by second lens component II, which is a concavo-convex positive singlet. A third lens component III is also a concavo-convex positive singlet and is followed by a fourth lens component IV, which is a concavo-convex positive doublet having a biconvex second element.

The parameters of objectives according to the present invention are set forth in Table I, wherein successive axial spaces are identified as $S_0$ to $S_3$ and axial thicknesses of successive lens elements are identified as $T_1$ to $T_5$. The radii of successive lens surfaces are designated $R_1$ to $R_9$ with the minus sign (−) being applied to the radius of a surface whose center of curvature lies on the object side of its vertex. The refractive indices and Abbe numbers of the successive lenses are absolute values designated $ND_1$ to $ND_5$ and $V_1$ to $V_5$ successively.

TABLE I

| Lens | Radius (R) | Thickness (T) | Spacing (S) | Refractive Index (ND) | Abbe No (ν) |
|---|---|---|---|---|---|
| | | | $S_0 = 0.105f$ | | |
| I | $R_1 = -0.473f$ | $T_1 = 0.493f$ | | $1.78 < ND_1 < 1.79$ | $50 < v_1 < 51$ |
| | $R_2 = -0.595f$ | | $S_1 = 0.012f$ | | |
| II | $R_3 = -1.782f$ | $T_2 = 0.329f$ | | $1.78 < ND_2 < 1.79$ | $50 < v_2 < 51$ |
| | $R_4 = -0.897f$ | | $S_2 = 0.627f$ | | |
| III | $R_5 = -2.199f$ | $T_3 = 0.329f$ | | $1.615 < ND_3 < 1.625$ | $60 < v_3 < 61$ |
| | $R_6 = -1.239f$ | | $S_3 = 0.014f$ | | |
| IV | $R_7 = -21.960f$ | $T_4 = 0.219f$ | | $1.75 < ND_4 < 1.76$ | $31 < v_4 < 32$ |
| | $R_8 = 1.385f$ | $T_5 = 0.697f$ | | $1.49 < ND_5 < 1.50$ | $81 < v_5 < 82$ |
| | $R_9 = -1.797f$ | | | | | wherein f is 3.5 to 5.5 mm.

One example of a species according to the present invention, where f=4.56 mm. is given in the following table.

TABLE II

| Lens | Radius (R) | Thickness (T) | Spacing (S) | Refractive Index (ND) | Abbe No (ν) |
|---|---|---|---|---|---|
| | | | $S_1 = 0.48$ | | |
| I | $R_1 = -2.157$ | $T_1 = 2.25$ | | $ND_1 = 1.786$ | $v_1 = 50$ |
| | $R_2 = -2.715$ | | $S_2 = 0.053$ | | |
| II | $R_3 = -8.127$ | $T_2 = 1.50$ | | $ND_2 = 1.786$ | $v_2 = 50$ |
| | $R_4 = -4.090$ | | $S_3 = 2.86$ | | |
| | $R_5 = -10.030$ | | | | |

TABLE II-continued

| Lens | Radius (R) | Thickness (T) | Spacing (S) | Refractive Index (ND) | Abbe No (ν) |
|---|---|---|---|---|---|
| III | | $T_3 = 1.50$ | | $ND_3 = 1.620$ | $\nu_3 = 60.3$ |
| | $R_6 = -5.650$ | | | | |
| | | | $S_4 = 0.062$ | | |
| | $R_7 = -100.16$ | | | | |
| IV | $R_8 = 6.319$ | $T_4 = 1.00$ | | $ND_4 = 1.757$ | $\nu_4 = 31.8$ |
| | | $T_5 = 3.175$ | | $ND_5 = 1.497$ | $\nu_5 = 81.3$ |
| | $R_9 = -8.194$ | | | | |

I claim:

1. A microscope objective having an NA of 0.66 consisting essentially of a concavo-hemispherical positive singlet I, a concavo-convex positive singlet II, a concavo-convex positive singlet III and a concavo-convex positive doublet IV wherein the parameters of the respective axial spacings ($S_0 - S_3$) in mm, radii ($R_1 - R_9$), in mm, with a minus sign (−) indicating a center of curvature on the object side of the lens, thickness ($T_1 - T_5$) in mm, indices of refraction ($ND_1 - ND_5$) and Abbe numbers ($\nu_1 - \nu_5$) are determined by the following table:

| Lens | Radius (R) | Thickness (T) | Spacing (S) | Refractive Index (ND) | Abbe No (ν) |
|---|---|---|---|---|---|
| | | | $S_0 = 0.105f$ | | |
| | $R_1 = -0.473f$ | | | | |
| I | | $T_1 = 0.493f$ | | $1.78 < ND_1 < 1.79$ | $50 < \nu_1 < 51$ |
| | $R_2 = -0.595f$ | | | | |
| | | | $S_1 = 0.012f$ | | |
| | $R_3 = -1.782f$ | | | | |
| II | | $T_2 = 0.329f$ | | $1.78 < ND_2 < 1.79$ | $50 < \nu_2 < 51$ |
| | $R_4 = -0.897f$ | | | | |
| | | | $S_2 = 0.627f$ | | |
| | $R_5 = -2.199f$ | | | | |
| III | | $T_3 = 0.329f$ | | $1.615 < ND_3 < 1.65$ | $60 < \nu_3 < 61$ |
| | $R_6 = -1.239f$ | | | | |
| | | | $S_3 = 0.014f$ | | |
| | $R_7 = -21.960f$ | | | | |
| | | $T_4 = 0.219f$ | | $1.75 < ND_4 < 1.76$ | $31 < \nu_4 < 32$ |
| IV | $R_8 = 1.385f$ | | | | |
| | | $T_5 = 0.697f$ | | $1.49 < ND_5 < 1.50$ | $81 < \nu_5 < 82$ |
| | $R_9 = -1.797f$ | | | | | wherein f is 3.5 to 5.5 mm.

2. The objective of claim 1 wherein f is 4.56 mm, $ND_1$ and $ND_2$ are 1.786, $ND_3$ is 1.620, $ND_4$ is 1.757, $ND_5$ is 1.497, $\nu_1$ and $\nu_2$ are 50.0 $\nu_3$ is 60.3, $\nu_4$ is 31.8 and $\nu_5$ is 81.3.

* * * * *